United States Patent [19]

Wakimoto et al.

[11] Patent Number: 4,852,957
[45] Date of Patent: Aug. 1, 1989

[54] OPTICAL SYSTEM FOR FLYING SPOT SCANNING APPARATUS

[75] Inventors: Zenji Wakimoto; Shinichi Nagata; Mikizo Katsuyama, all of Kyoto, Japan

[73] Assignee: Dainippon Screen Mfg. Co., Ltd., Japan

[21] Appl. No.: 185,093

[22] Filed: Apr. 22, 1988

[30] Foreign Application Priority Data

Apr. 24, 1987 [JP] Japan ............... 62-102836

[51] Int. Cl.$^4$ ............... G02B 26/10
[52] U.S. Cl. ............... 350/6.6; 350/6.91; 358/494
[58] Field of Search ............... 350/6.1, 6.5, 6.6, 6.7, 350/6.8, 6.9, 6.91; 358/293

[56] References Cited

U.S. PATENT DOCUMENTS 4,404,596 9/1983 Juergensen et al. ............... 358/293
4,647,145 3/1987 Maeda et al. ............... 350/6.8
4,690,485 9/1987 Plaot ............... 350/6.5

OTHER PUBLICATIONS

*Handbook of Optics*, pp. 2–32, 1978.

Primary Examiner—Rodney B. Bovernick
Assistant Examiner—Loha Ben
Attorney, Agent, or Firm—Ostrolenk, Faber, Gerb & Soffen

[57] ABSTRACT

An optical system for use in a flying spot scanning apparatus. The optical system includes a laser tube, an optoelectronic integrated circuit which divides a laser beam into a plurality of beams and individually modulates the beams, a focusing lens for focusing the beams, a deflection mirror for reciprocatingly deflecting the beams to scan a recording medium, a concave mirror receiving the beams thereon, and a recording medium disposed optically behind the concave mirror. The recording medium is fed in a predetermined direction while the beams are scanned across the recording medium.

17 Claims, 14 Drawing Sheets

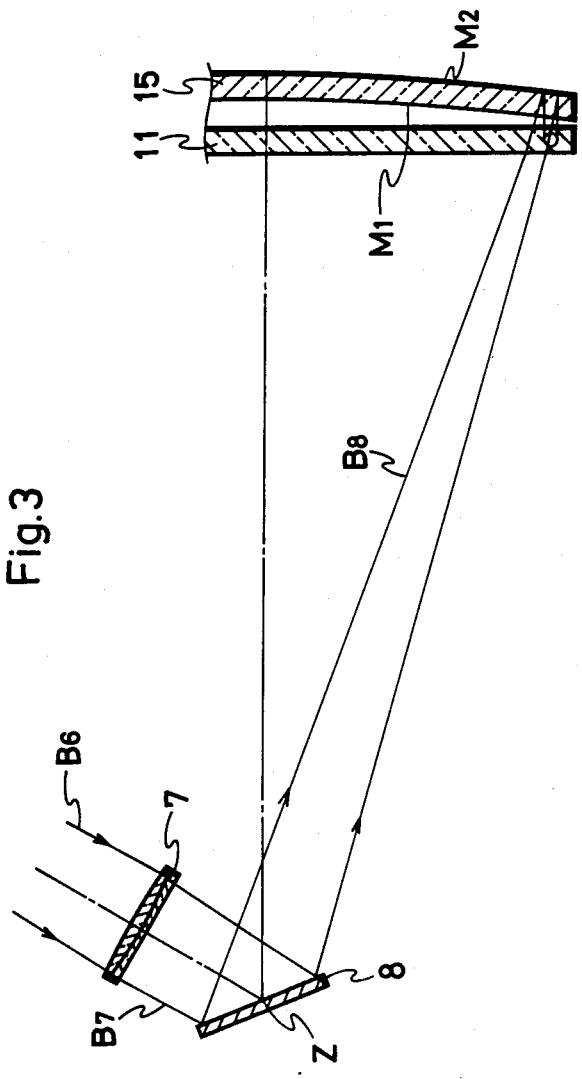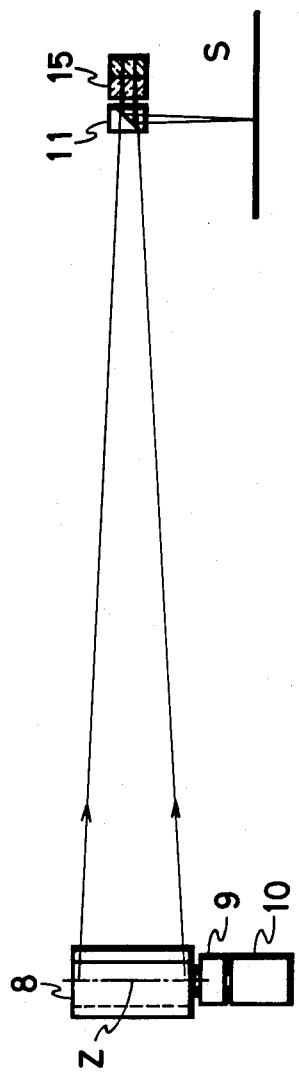

OPTICAL SYSTEM FOR FLYING SPOT SCANNING APPARATUS

BACKGROUND OF THE INVENTION

The present invention relates generally to an improved apparatus for recording an image on a recording medium, and particularly to an optical system for use in a so-called flying spot scanning system (hereinafter referred to as "flying spot scanner").

There have been several proposals for the improvement of the flying spot scanner. One of them is shown in U.S. Pat. No. 4,034,408, wherein a laser beam emitted from a light source is modulated by an optical modulator in response to image signals. The laser beam is then deflected by a multifaced rotating polygon and condensed by an f-theta lens which is provided immediately after the polygon, whereby a recording spot of the laser beam scans a recording medium which is fed in a direction perpendicular to the direction in which the recording spot runs, to record a desired image on the recording medium.

Another proposal is shown in a publication "KOGAKU" (Japanese Journal of Optics) Vol. 6, No. 2, pp. 67–74, entitled "The Correcting Method of Beam Scanning Distortion Using the Parabolic Mirror". In order to correct distortion on a recording plane, a laser beam emitted from a light source is first expanded by a beam expander, then deflected by a galvanometer mirror and in turn reflected by a parabolic mirror which is directed toward a recording medium, whereby the recording spot of the laser beam scans the recording medium, to record a desired image thereon.

Recently, there has been a demand for a system which can record an image onto a recording medium of relatively large size, (e.g. having an effective recording width of approximately 500 mm to 1000 mm) with high resolution. Such recording requires a recording spot with a fine diameter, e.g. up to approximately 3 $\mu$m to 10 $\mu$m at half-width power thereof. However, conventional apparatuses cannot meet such demands satisfactorily. The reasons are discussed hereinbelow.

Generally, when a conventional apparatus is used to record on a large-sized recording medium, large undesirable aberrations are caused. The diameter of a recording spot $W_o$ can be expressed by:

$$W_o = k \cdot \lambda \cdot F \tag{1}$$

where k is a constant, $\lambda$ is a wave length and F is an F-number.

To reduce the diameter of the recording spot $W_o$ in the apparatus illustrated in U.S. Pat. No. 4,034,408 to approximately 3 $\mu$m to 10 $\mu$m, an f-theta lens having a small F-number would have to be prepared, since both k and $\lambda$ are constant. It will be impractical, though not impossible in a theoretical sense, to obtain such an f-theta lens which meets the conditions required. It could, of course, be possible to correct the aberrations by using only a paraxial region of the f-theta lens. However, then the apparatus as a whole would be undesirably large because the optical path would be too long. This is apparently disadvantageous.

Furthermore, even if an f-theta lens which could satisfactorily reduce a recording spot to approximately 3 $\mu$m to 10 $\mu$m, polygon having reflective surfaces large enough to scan a whole recording width of a recording medium would be required. Such a multi-faced rotating polygon would have to have a diameter of 500 mm and would have to be controlled at a predetermined rotation rate so as to accurately scan the recording spot across a recording medium. This would be impracticable and costly.

With respect to the apparatus illustrated in the publication "KOGAKU", aberrations, particularly coma and astigmatism, cannot be corrected by means of a parabolic mirror. Accordingly, the diameter of the recording spot cannot be reduced to approximately 3 $\mu$m to 10 $\mu$m.

SUMMRY OF THE INVENTION

In view of the foregoing, it is a principal object of the present invention to provide an improved optical system particularly useful for a so-called flying spot scanning apparatus.

It is another object to provide an optical system which permits recording on a relatively large size recording medium, e.g. of 500 mm to 1000 mm in width, with a fine recording spot, e.g. approximately 3 $\mu$m to 10 $\mu$m in half-width thereof.

It is a further object to provide an optical system which permits a flying spot scanning apparatus to be compact.

It is a further object to provide an optical system which can correct undesirable aberrations.

The aforementioned objects are accomplished by the present invention, with an optical system which includes a light source emitting a light beam; optical modulator means for modulating the light beam; a focusing lens forming a beam waist on an optical axis thereof; deflection means disposed optically between the focusing lens and a recording medium for reciprocatingly deflecting the light beam to scan the recording medium; a concave mirror disposed optically between the deflection means and the recording medium, the concave mirror extending along a direction where a recording spot of the light beam runs thereon; and a recording medium optically behind the concave mirror, the recording medium being laid on an image plane of the optical system and fed in a predetermined direction while the recording spot scans the recording medium, wherein the deflection means being disposed at a position where a distance given by subtracting a distance between the focusing lens and the deflection means from a distance between the focusing lens and the beam waist formed by the focusing lens, is approximately equal to the focal length of the concave mirror, and the concave mirror comprising a second-surface mirror disposed at such a position as the following formula be satisfied:

$$0.75 < b/V < 0.95 \tag{2}$$

where V is a distance given by subtracting a distance between the focusing lens and the deflection means from a distance between the focusing lens and a beam waist formed by the focusing lens, and b is a distance between the deflection means and the concave mirror.

It is preferable that the deflection means is positioned at a position where the following formula is satisfied:

$$0.9 < f_M/V < 1.05 \tag{3}$$

where V is a distance given by subtracting a distance between the focusing lens and the deflection means from a distance between the focusing lens and a beam waist formed by the focusing lens, and $f_M$ is a focal length of the concave mirror.

It is also preferable that the second-surface mirror comprises a concave optical glass plate, whose back surface is coated by metal film, the front surface thereof forming a first surface and the back surface forming a second surface of the concave mirror, the concave mirror being designed so that the following formula is satisfied:

$$0.95 < r_1/r_2 < 1.0 \qquad (4)$$

where $r_1$ is a radius of the first surface of the concave mirror, and $r_2$ is a radius of the second surface thereof.

According to the present invention, the concave mirror can be either spherical or parabolic. By way of compactness, it is preferable to form the concave mirror into a band extending along a direction where the light beam is deflected by the deflection means.

According to another aspect of the invention, the second-surface mirror can be replaced with a first-surface mirror including a concave reflection surface which forms a first surface of the concave mirror. In this case, it is preferable that a meniscus lens is disposed optically between the deflection means and the concave mirror, the meniscus lens being designed so that the following formula is satisfied:

$$|V/f_N| < 0.02 \qquad (5)$$

where V is a distance given by subtracting a distance between the focusing lens and the deflection means from a distance between the focusing lens and a beam waist formed by the focusing lens, and $f_N$ is a focal length of the meniscus lens.

Practically, it is preferable that a beam dividing means is disposed between the light source and the modulator means for dividing a light beam into a plurality of light beams. In this case, the modulator is designed so that the respective light beams are individually modulated.

It is also preferable that a field lens is disposed between the modulator means and the focusing lens. The field lens is designed so that the principal rays of the light beams are consistent with each other on the deflection means.

In a case where the respective light beams are received in a form of parallel rays, by the incident surface of the focusing lens, the beam waist formed by the focusing lens will correspond to a back focus of the focusing lens. In order that such parallel rays are received by the focusing lens, a collimator lens may be disposed optically before the focusing lens.

It is practically preferable that a condenser lens is disposed between the light source and the modulator means, whereby a light beam emitted from the light source is condensed to enter the modulator means.

Having the aforementioned features, the present invention has the following useful advantages:

A recording spot focused on a recording medium can be extensively reduced (up to 3 μm to 10 μm). Thus, resolution power can be increased, while the effective scanning length can be made to be long to the extent of 500 mm to 1000 mm.

Curvature of field can be effectively reduced, by which a substantially flat image plane can be produced.

A deflection mirror can be efficiently minimized, whereby the scanning speed can be sufficiently increased.

Undesirable aberrations, particularly coma and astigmatism, can be efficiently corrected, whereby a fine recording spot can be produced.

Furthermore, the flying spot scanning apparatus can be made compact as a whole.

Other novel features and advantages of the present invention will become apparent in the course of the following detailed description taken together with the accompanying drawings, which are directed only to the understanding of the present invention and not to the restriction of the scope of the invention.

BRIEF DESCRIPTION OF THE DRAWINGS

FIG. 3 is a schematic partial plan view of FIG. 1;

FIG. 4 is a side view of FIG. 3;

DETAILED DESCRIPTION OF PREFERRED EMBODIMENTS

Figure 1:
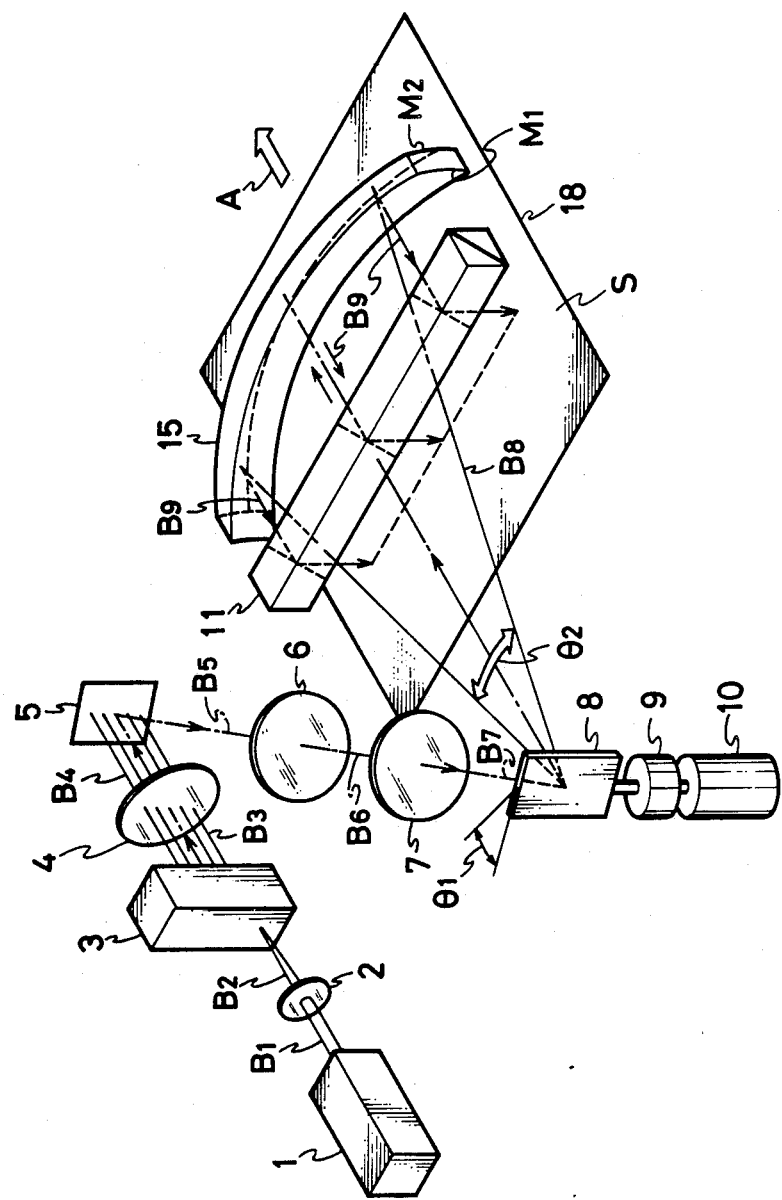
FIG. 1 is a schematic perspective view of a flying spot scanning apparatus according to a first embodiment of the present invention.
Figure 2:
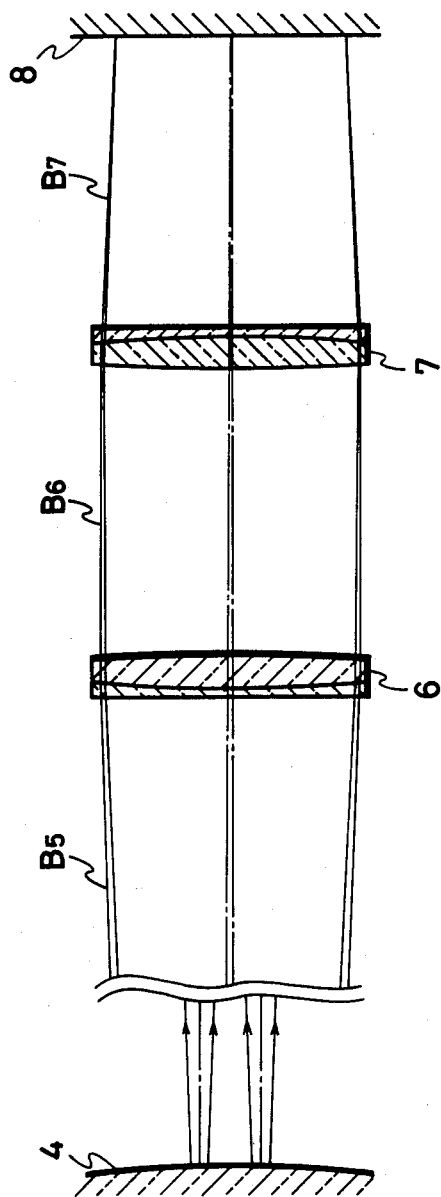
FIG. 2 is a schematic partial side view of FIG. 1.

Referring to FIGS. 1 to 4, a laser beam $B_1$ emitted from a light source 1 first passes through a condenser lens 2. The laser beam $B_1$ is condensed by the condenser lens 2 and a beam $B_2$ emerges therefrom. The beam $B_2$ then enters an optoelectronic integrated circuit (hereinafter referred to as OEIC) 3 in which the beam $B_2$ is divided into twenty-one beams $B_3$. The twenty-one beam $B_3$ are in turn individually modulated by the OEIC to emerge therefrom. The beams $B_3$ are transmitted through a field lens 4 to impinge upon a folding mirror 5. In FIG. 1, the laser beams impinging upon the folding mirror 5 are denoted by $B_4$, and those reflected thereby are denoted by $B_5$. The laser beams $B_5$ then pass through a collimator lens 6. The beams $B_5$ are corrected by the collimator lens 6 to be well-collimated beams $B_6$. The beams $B_6$ are received by a focusing lens 7 which focuses the beams on a recording surface S of a recording medium 18 through optical elements which include a deflection mirror 8, a beam directing device 11 and a concave mirror 15.

The deflection mirror 8 is rectangular and is controlled by a galvanometer 10 coaxially mounted on a drive shaft. A pulse encoder 9 (also mounted on the drive shaft) is used for outputting clock pulses for use in reading out image signals from a memory. The laser beams $B_7$ impinging upon the deflection mirror 8 are deflected to the concave mirror 15 and traverse the reflecting surface of the concave mirror 15 through the beam directing device 11.

The beam directing device 11 comprises a pair of triangular prisms having a thin metal film on a border plane therebetween. The beam directing device 11 allows only the laser beams $B_8$ to be transmitted therethrough. The beams $B_9$ are directed by the thin metal film of the directing device 11 to the recording surface S of the recording medium 18. The recording medium 18 is fed in a direction A at a predetermined velocity while the laser beams scan the recording surface S in a direction perpendicular to the direction A.

In this embodiment, the flying spot scanning apparatus is arranged so that the effective scanning length is approximately 1000 mm and so that the diameter of each recording spot on the recording surface is 5.5 μm at half-width power.

The source of the laser beam 1 comprises e.g. an Ar-laser tube which emits an Ar-laser having a wave length of 488 nm.

The OEIC 3 comprises an assembly of both an optical wavelength device for dividing a laser beam into a plurality of (e.g. twenty-one) beams $B_3$ and an optical modulator provided at the exit of the waveguide device for individually modulating the respective laser beams $B_3$ in response to image signals.

The OEIC 3 may, of course, be replaced with a separately installed conventional optical beam splitter and a separately installed optical modulator.

The collimator lens 6 is positioned a distance equal to its focal length from the exit of the OEIC 3 so that the beams $B_3$ are collimated to enter the incident surface of the focusing lens 7. Thus, the emerging laser beams $B_6$ overlap each other on the incident surface of the focusing lens 7.

the focusing lens 7 comprises a so-called objective lens which makes parallel incident rays focus upon a point. The focusing lens 7 comprises a single optical unit including two lenses. The focal length and effective aperture of the focusing lens 7 are designed so that the diameter of the laser beams on the recording surface S is 5.5 μm at half-width power. The lens data thereof are listed hereinbelow.

TABLE 1

|   | r (mm)    | d (mm) | n       |
|---|-----------|--------|---------|
| 1 | 1308.471  | 22.778 | 1.52224 |
| 2 | −860.674  | 7.593  | 1.63178 |
| 3 | −3168.436 |        |         | f = 2125.091 (mm)
Effective Aperture = 182 (mm)
Back Focus = 2109.704 (mm)

The intensity of the laser beams $B_6$ represents $B_7$ emerging from the focusing lens 7 is 182 mm. Thus, the peripheral intensity of the beams will be $e^{-2}$ times (i.e. 13%) the intensity at the center thereof.

The field lens 4 adjusts the laser $e^{-2}$ times (i.e. 13%) of that at the center thereof.

The field lens 4 is provided for adjusting the laser beams so that the respective principal rays of the laser beams $B_7$ are consistent with each other at a point on the rotating axis Z of the deflection mirror 8, whereby the height of the deflection mirror 8 can be lowered efficiently.

The angles formed by respective adjacent principal rays of the beams $B_6$ are approximately the same (i.e. they are approximately 0.63 seconds), and on this condition the twenty-one recording (spots of 5.5 μm in diameter) are aligned at intervals of 5.5 μm in the direction of the arrow A on the recording plane S. In this embodiment, the rotating axis Z of the deflection mirror 8 is positioned at a distance of 227.782 mm from the exit surface of the focusing lens 7.

The deflection mirror 8 is also arranged so that the rotating axis Z thereof is positioned approximately at the focal point of the concave mirror 15. The deflection mirror 8 is reciprocatingly rotated by the galvanometer 10 up to a predetermined rotation angle $\theta_1$, to cause the laser beams $B_7$ to traverse the reflecting surface of the concave mirror 15.

In this embodiment, the deflecting surface of the mirror 8 is 220 mm in width and 180 mm in height, and its effective rotation angle $\theta_1$ is ±9 degrees. The scanning angle $\theta_2$ of the beams deflected by the deflection mirror 8 is ±18 degrees.

The concave mirror 15 comprises a second-surface spherical mirror which includes an optical glass plate forming a first-surface of the mirror and an aluminized or silvered reflecting surface coated on the back surface thereof. For compactness, the concave mirror 15 is formed into a spherical band extending in the direction of scanning. Conditions of the concave mirror 15 are listed hereinbelow.

The radius $r_1$ of the first-surface $M_1$: −3626.372 mm

The radius $r_2$ of the second-surface $M_2$: −3807.674 mm

The distance between the first- and second-surfaces at the center thereof: 40 mm The refractive index of the glass plate: 1.52224

The focal length of the concave mirror 15: 1936.057 mm

The ratio of $r_1$ to $r_2$ is 0.952, as can be understood from the above conditions.

In this embodiment, the deflection mirror 8 is positioned at a distance of 1512.336 mm from the center of the first-surface M of the concave mirror. The distance V (obtained by subtracting the distance between the focusing lens 7 and the deflection mirror 8 from the back focus of the focusing lens 7) is 1881.922 mm, therefore, the focal length $f_M$ can be expressed by:

$$f_M = 1.03 \, V \tag{6}$$

The ratio of $f_M$ to V is 1.03, and the ratio of the distance b (between the deflection mirror and the concave mirror) to the distance V, comes into 0.795.

When the distance V is approximately equal to the focal length $f_M$ of the concave mirror 15, an image surface formed by the scanning spots will be flat.

The glass plate of the second-surface mirror 15 functions as a thick, meniscus lens having a considerably long focal length. This eliminates coma and astigmatism caused by the inconsistency between the radius center of the concave reflecting surface $M_2$ and the rotating axis Z of the deflection mirror 8.

The beam directing device 11 is disposed between the deflection mirror 8 and the concave mirror 15. The beam directing device 11 allows only the beams $B_8$ to transmit therethrough and directs the beams $B_9$ to the recording surface. In this embodiment, the beam directing device 11 is a square pole extending in the scanning direction. The beam directing device 11 includes a pair of triangular prisms cemented to each other. The beam directing device 11 has a thickness of 45 mm in both the horizontal and vertical directions and refractive index equal to 1.52224. The beam directing device 11 is positioned so that the exit surface of the beams $B_8$ is 47.953 mm from the center of the first surface $M_1$ of the concave mirror and so that the exit surface of the beams $B_9$ is 199.042 mm from the recording surface (i.e. image surface) S.

Since the rotating angle $\theta_1$ of the deflection mirror 8 is ±9 degrees, the effective scanning length will be 1000 mm on the image plane S. The diameter of the recording spots will be 5.5 μm at half-width power.

Figure 5:
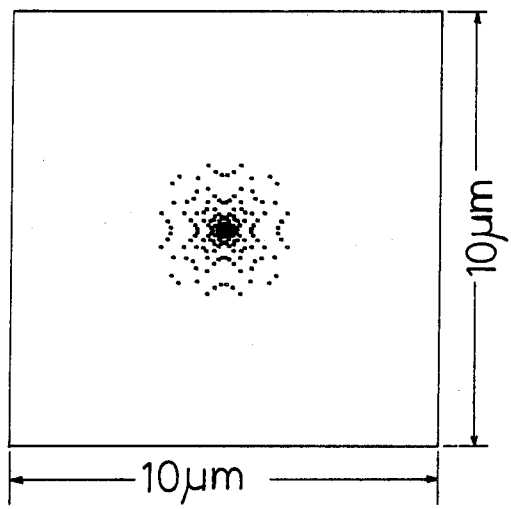
FIGS. 5-(A) to 5-(C) are spot diagrams corresponding to the first embodiment of the present invention.
Figure 5:
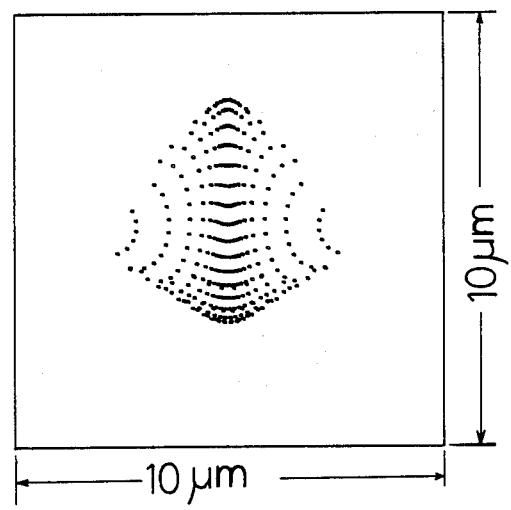
Figure 5:
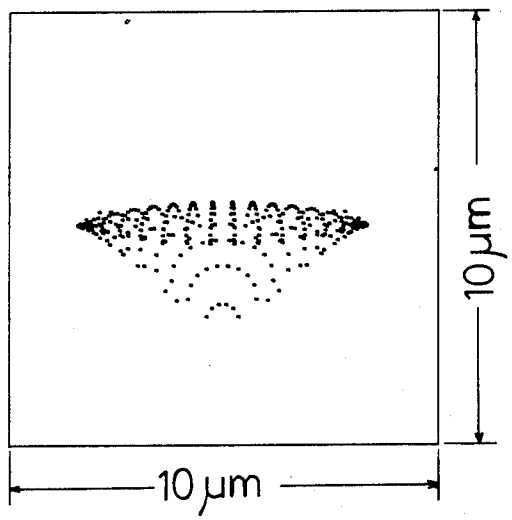

FIGS. 5-(A) to 5-(C) are spot diagrams, on the image planes, of one of the twenty-one beams when the image height is 0 mm, 350 mm and 500 mm, respectively. The frame size these diagrams is of 10 μm square, therefore the lateral aberration of the recording spot is no greater than approximately ±4 μm.

According to the embodiment mentioned above, the Strehl definition can be more than 0.90 for every scanning spot aligned on the recording surface. Interval variations between adjacent scanning spots, which are aligned in the direction A, are no more than 2.2% (i.e. 0.12 μm) even when the image height is 500 mm.

SECOND EMBODIMENT

Figure 6:
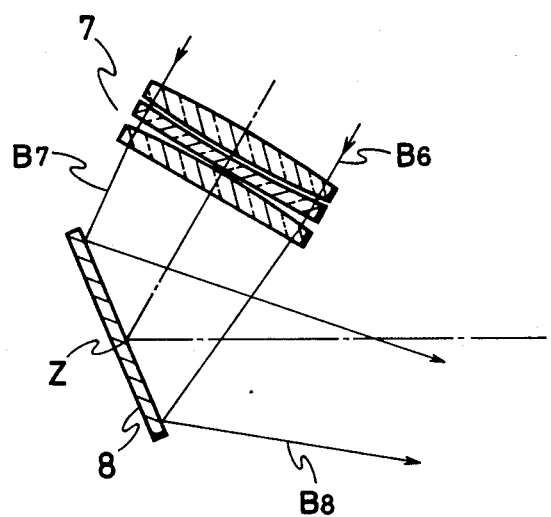
FIG. 6 is a schematic partial plan view of a second embodiment of the present invention.
Figure 7A:
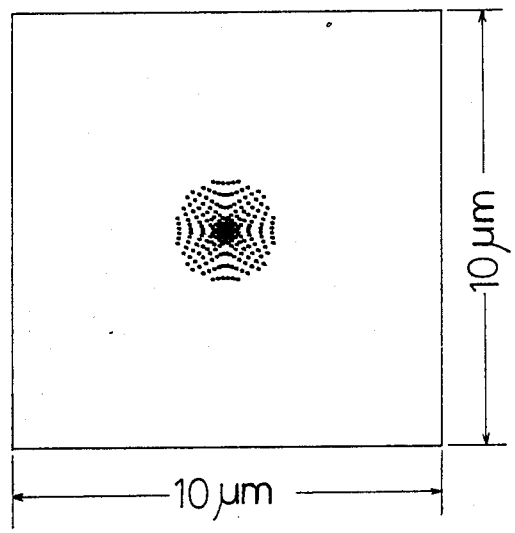
FIGS. 7-(A) to 7-(C) are spot diagrams corresponding to the second embodiment of the present invention.
Figure 7B:
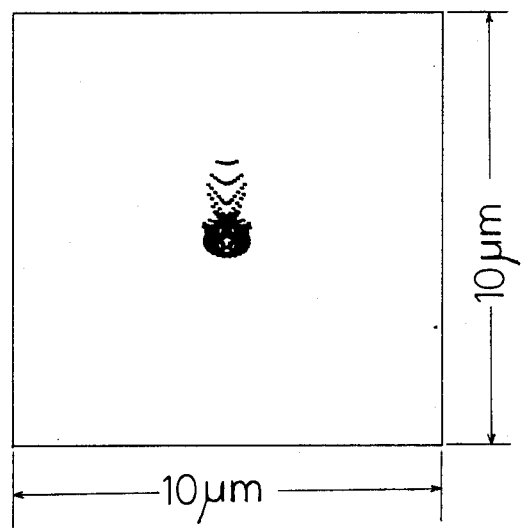
Figure 7C:
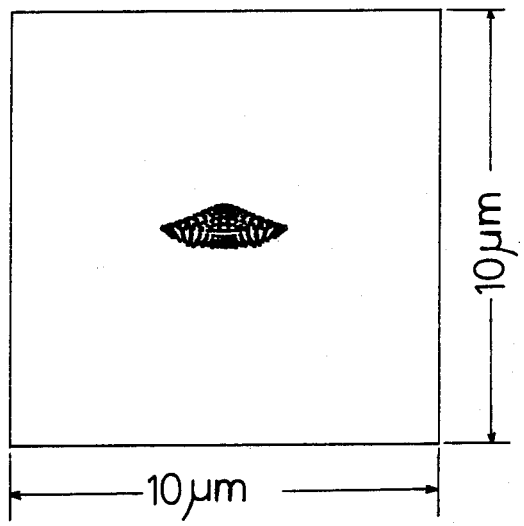

The embodiment of FIGS. 1, 6 and 7 has substantially the same basic structure as in the first embodiment except for the beam directing device 11. In this embodiment, the optical elements are designed so that the effective scanning length is 420 mm and the diameter of the scanning spots is 3 μm at half-width power.

The focusing lens 7 comprises a single optical unit including three lenses, whose lens data are shown hereinbelow.

TABLE 2

|   | r (mm) | d (mm) | n |
|---|---|---|---|
| 1 | 1274.369 | 26.583 | 1.52224 |
| 2 | −1092.209 | 5.317 | |
| 3 | −1050.816 | 10.633 | 1.63178 |
| 4 | −5605.074 | 5.317 | |
| 5 | 798.878 | 21.267 | 1.52224 |
| 6 | 2297.416 | | | f = 1212.785 (mm)
Effective Aperture = 190 (mm)
Back Focus = 1175.812 (mm)

The deflection mirror 8 is disposed at a distance 167 mm from the focusing lens 7 and of 811.723 mm from the concave mirror 15. The distance V given by subtracting the distance between the focusing lens 7 and the deflection mirror 8 from the back focus of the focusing lens 7 is 1008.812 mm. The rotating angle $\theta_1$ is ±7 degrees.

The concave mirror 15 comprises a second-surface mirror similar to the mirror in the first embodiment, conditions of which are listed hereinbelow.

The radius $r_1$ of the first-surface $M_1$: −1995.230 mm
The radius $r_2$ of the second-surface $M_2$: −2019.7780 mm
The distance between the first- and second-surfaces at the center thereof: 30 mm
The refractive index of the glass plate: 1.52224

The focal length of the concave mirror 15: 1003.275 mm

The ratio of $r_1$ to $r_2$ is 0.988, as can be understood from the above conditions.

From the aforementioned conditions, it will be understood that the focal length $f_M$ can be expressed by:

$$f_M = 0.995 \, V \quad (7)$$

The ratio of $f_M$ to V is 0.995 and the ratio of the distance b (between the deflection mirror) and the concave mirror to V is 0.81.

Furthermore, in this embodiment, a so-called half-mirror made of a thin film is employed instead of the beam directing device 11. The half-mirror functions in substantially the same manner as the beam directing device 11 of the first embodiment. The half-mirror is positioned at a distance 50 mm from the concave mirror 15 and of 81.188 mm from the recording surface S.

In this embodiment, since the rotating angle $\theta_1 = \pm 7$ degrees the effective scanning length comes is 420 mm on the recording surface S. The diameter of the recording spots is 3 μm at half-width power thereon.

FIGS. 7-(A) to 7-(C) show spot diagrams, on the image plane, of one of the twenty-one beams when the image height is 0 mm, 147 mm and 210 mm, respectively. The frame size these diagrams is of 10 μm square. Therefore, the lateral aberration of the recording spot is no greater than approximately ±2 μm.

The Strehl definition can be more than 0.96 for every scanning spot aligned on the image plane. Interval variations between adjacent scanning spots, which are aligned in the direction A, are no more than 1.4% even when the image height is 210 mm.

THIRD EMBODIMENT

Figure 8:
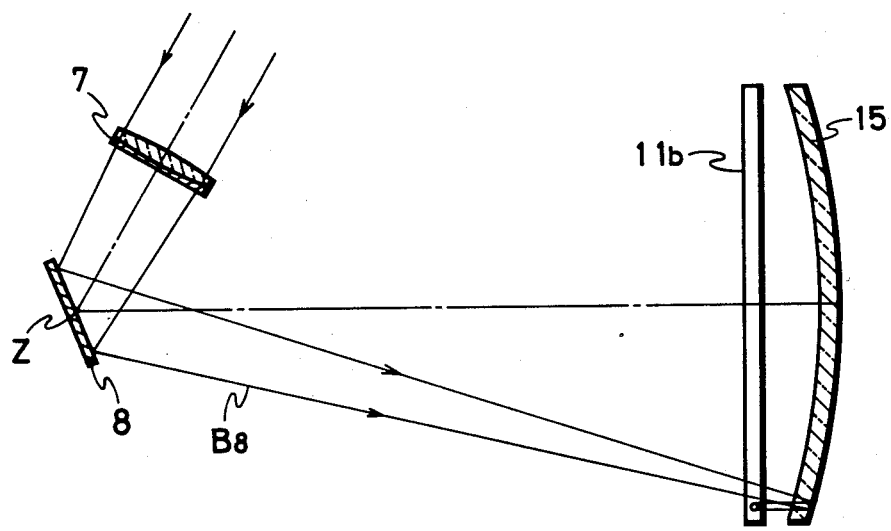
FIG. 8 is a schematic partial plan view of a third embodiment embodying the present invention.
Figure 9:
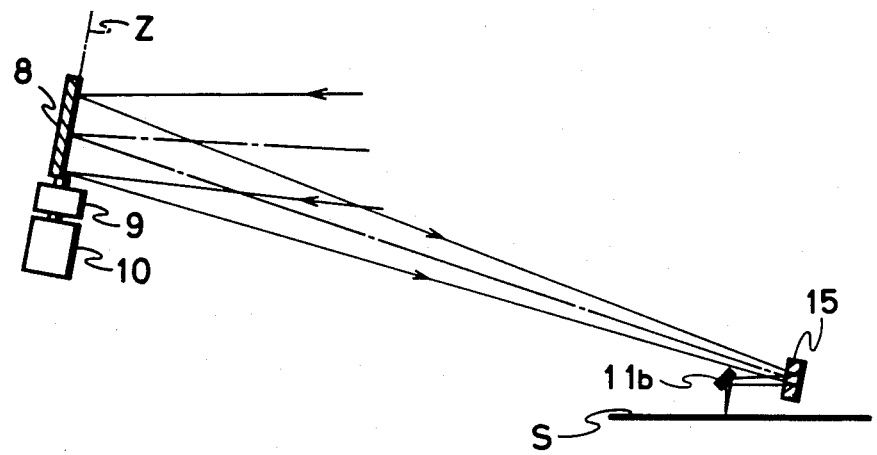
FIG. 9 is a side view of FIG. 8.

The embodiment of FIGS. 1, 8 and 9 has substantially the same basic structure as in the first and second embodiments, except for the beam directing device 11 or the half-mirror. The laser beams $B_8$ deflected by the deflection mirror 8 are directed directly to the concave mirror 15. That is the beam directing device 11 of the first embodiment and the half-mirror of the second embodiment are eliminated. Thus, intensity of the respective beams are not reduced. As illustrated in FIG. 9, the laser beams $B_8$ are somewhat inclined to strike the concave mirror 15.

The optical elements of the third embodiment are designed so that the effective scanning length is 560 mm and so that the diameter of the scanning spots is 5.6 μm at half-width power.

The focusing lens 7 comprises a single optical unit including two lenses, whose lens data are shown hereinbelow.

TABLE 3

|   | r (mm) | d (mm) | n |
|---|---|---|---|
| 1 | 863.120 | 15.025 | 1.52224 |
| 2 | −567.736 | 5.009 | 1.63178 |
| 3 | −2090.030 | | | f = 1401.795 (mm)
Effective Aperture = 120 (mm)
Back Focus = 1391.645 (mm)

The deflection mirror 8 is positioned at a distance of 225 mm from the focusing lens F and 990.845 mm from the concave mirror 15 so that the distance V (obtained by subtracting the distance between the focusing lens 7 and the deflection mirror 8 from the back focus of the focusing lens 7,) is 1166.645 mm. The rotating axis of the deflection mirror 8 is inclined by 8 degrees rrelative to a vertical axis. The rotating angle $\theta_1$ of the deflection mirror 8 is ±8 degrees.

The concave mirror 15 comprises a second-surface mirror similar to the concave mirrors of the first and second embodiments, conditions of which are listed hereinbelow.

The radius $r_1$ of the first-surface $M_1$: −2291.604 mm
The radius $r_2$ of the second-surface $M_2$: −2311.511 mm
The distance between the first- and second-surfaces at the center thereof: 20 mm
The refractive index of the glass plate: 1.52224
The focal length of the concave mirror 15: 1152.281 mm
The ratio of $r_1$ to $r_2$ is 0.991, as can be understood from the above conditions.

From the aforementioned conditions, it will be understood that the focal length $f_M$ can be expressed by:

$$f_M = 0.988 \, V \quad (8)$$

The ratio of $f_M$ to V is 0.988, and the ratio of the distance b (between the deflection mirror 8 and the concave mirror 15) to V is 0.85.

Because of the inclination of the beams $B_8$, the optical axis of the concave mirror 15 (i.e. the normal axis of the reflecting surfaces $M_1$ and $M_2$) is inclined by 7.373 degrees relative to the optical axis of the beams $B_7$.

In this embodiment, a total reflection mirror 11b installed and is positioned at a distance 80 mm from the concave mirror 15 and of 50 mm from the recording surface S. The reflection mirror 11b is arranged so that the normal axis thereof forms an angle of 45.18 degrees relative to the recording surface.

In this embodiment, since the rotating angle $\theta_1 = \pm 8$ degrees, the effective scanning length is 560 mm on the recording surface S and the diameter of the recording spots is 5.6 μm at half-width power.

Figure 10A:
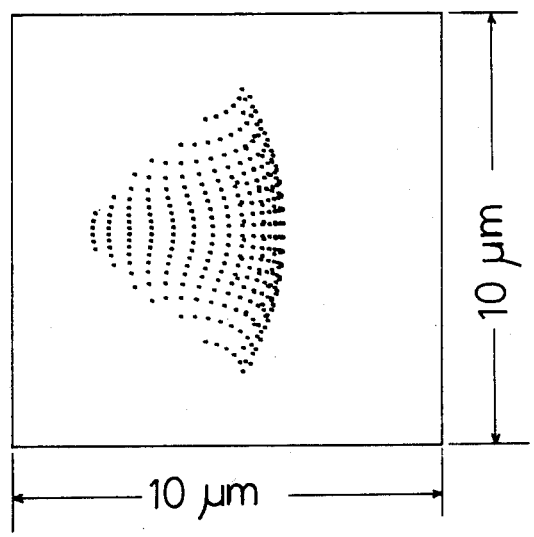
FIGS. 10-(A) to 10-(C) are spot diagrams corresponding to the third embodiment of the present invention.
Figure 10:
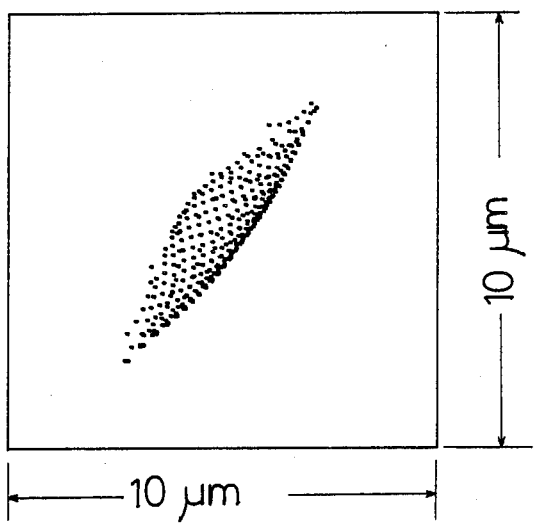
Figure 10:
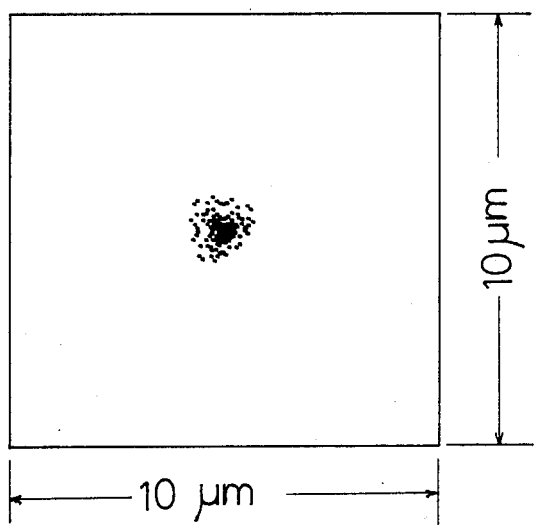

FIGS. 10-(A) to 10-(C) are spot diagrams, on the image plane S, of one of the twenty-one beams when the image height is 0 mm, 200 mm and 280 mm, respectively. The frame size these diagrams is of 10 μm square. Therefore the lateral aberration of the recording spot is no greater than approximately ±3.5 μm.

According to this embodiment, the Strehl definition can be more than 0.90 on every scanning spot aligned for the recording surface. Interval variations between adjacent scanning spots, which are aligned in the direction A, are no more than 1.9% even when the image height is 280 mm.

FOURTH EMBODIMENT

Figure 11:
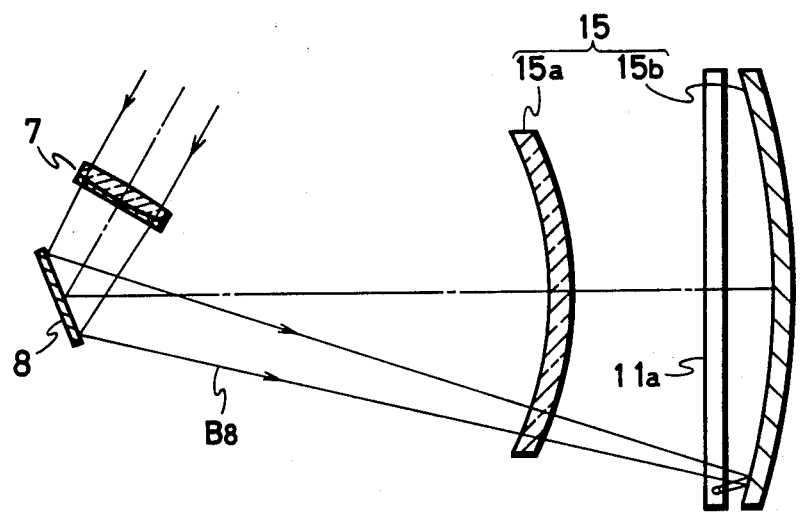
FIG. 11 is a schematic partial plan view of a fourth embodiment of the present invention.
Figure 12:
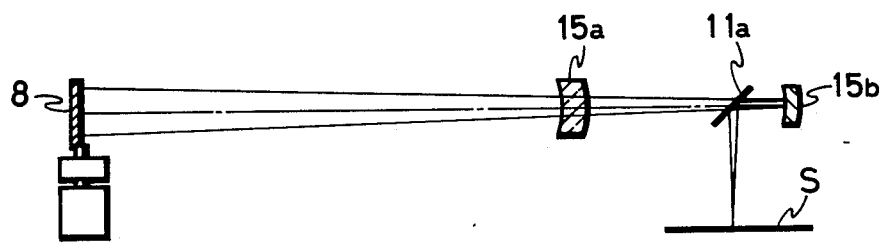
FIG. 12 is a side view of FIG. 11.

The embodiment of FIGS. 1, 11 and 12 has substantially the same basic structure as in the precedent embodiments, except for the concave miror 15. A meniscus lens 15a having a considerably long focal length and a concave first-surface mirror 15b are installed instead of the concave second-surface mirror 15 of the precedent embodiments.

In this embodiment, the optical elements are designed so that the effective scanning length is 550 mm, and so that the diameter of the scanning spots is 8.4 μm at half-width power.

The focusing lens 7 comprises a single optical unit including two lenses, whose lens data are shown hereinbelow.

TABLE 4

| | r (mm) | d (mm) | n |
|---|---|---|---|
| 1 | 765.318 | 8.00 | 1.52224 |
| 2 | −509.284 | 4.99 | 1.63178 |
| 3 | −1894.366 | | | f = 1250.0 (mm)
Effective Aperture = 71.8 (mm)
Back Focus = 1244.083 (mm)

The deflection mirror 8 is positioned at a distance 144.083 mm from the focusing lens 7 and of 663.320 mm from the meniscus lens 15a thus, the distance V, obtained by subtracting the distance between the focusing lens 7 and deflection mirror 8 from the back focus of the focusing lens, is 1100 mm. The rotating angle $\theta_1$ is ±8 degrees.

The meniscus lens 15a is positioned at a distance of 274.396 mm from the concave mirror 15b. The concave surface of the meniscus lens 15a is directed toward the deflection mirror 8. For compactness, the meniscus lens 15a is a spherical band similarly to the precedent embodiments. Conditions of the meniscus lens 15a are shown hereinbelow.

TABLE 5

| | r (mm) | d (mm) | n |
|---|---|---|---|
| 1 | −593.626 | 30.00 | 1.52224 |
| 2 | −610.498 | | | f = −1.05 × $10^5$ (mm)

The ratio of the distance V to the focal length $f_N$ of the meniscus lens 15a is −0.01.

The concave mirror 15b comprises a parabolic first-surface mirror with a thin metal coating on the front incident surface thereof. The focal length $f_M$ of the mirror 15b is 1096.694 mm. The focal length $f_M$ can also be expressed by:

$$f_M = 0.997 \, V \quad (9)$$

The ratio of $f_M$ to V is 0.997 and the ratio of the distance b (between the deflection mirror 8 and the concave mirror 15b) to V is 0.88.

The concave mirror 15b is disposed at a distance of 957.424 mm from the deflection mirror 8.

A half-mirror 11a is installed between the meniscus lens 15a and the concave mirror 15b for transmitting only the beams $B_8$ therethrough and directing the beams reflected by the concave mirror 15b to the recording surface S. The half-mirror 11a is made of a thin film (as in the second embodiment), and is positioned at a distance of 50 mm from the concave mirror 15b and 89.225 mm from the recording surface 8.

In this embodiment, undesirable aberrations, particularly coma and astigmatism caused by the parabolic mirror 15b, can be effectively corrected by means of the meniscus lens 15a.

Figure 13:
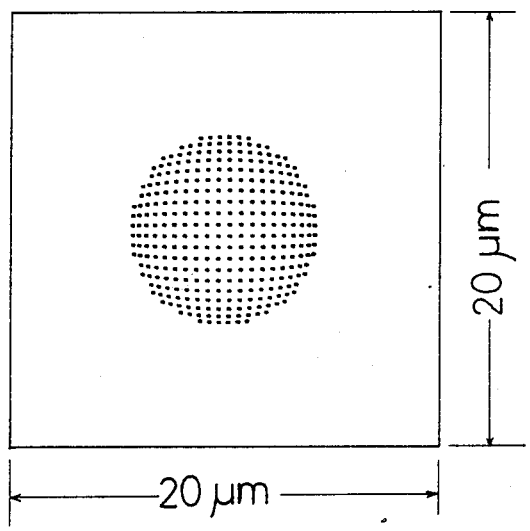
FIGS. 13-(A) to 13-(C) are spot diagrams corresponding to the fourth embodiment of the invention.
Figure 13:
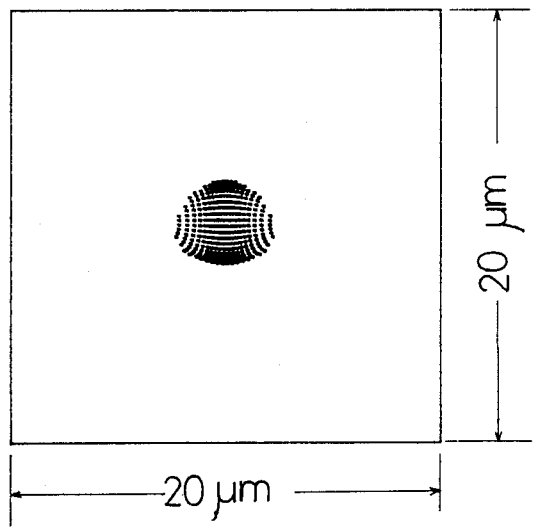
Figure 13C:
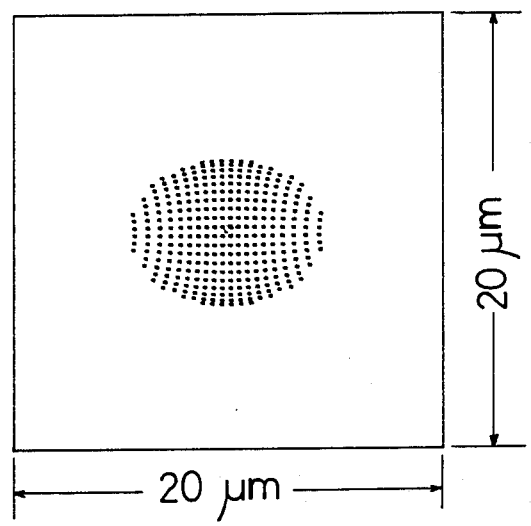

FIGS. 13-(A) to 13-(C) are spot diagrams, on the image plane, of one of the twenty-one beams when the image height is 0 mm, 200 mm and 275 mm, respectively. The frame size these diagrams is of 20 μm square. Therefore, the lateral abberation of the recording spot is no greater than approximately ±5 μm.

The Strehl definition can the more than 0.92 for every scanning spot aligned on the image plane. Interval variations between adjacent scanning spots, which are aligned in the direction A, are no more than 2.0% even when the image height is 275 mm.

FIFTH EMBODIMENT

Figure 14:
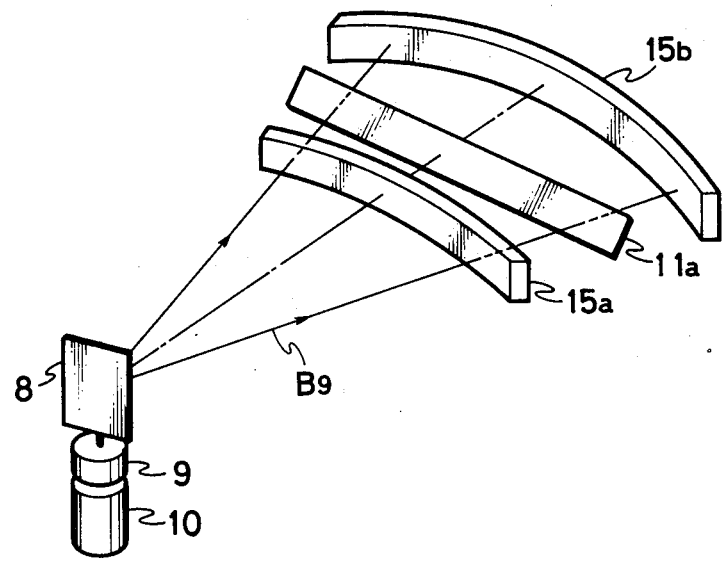
FIG. 14 is a perspective view of part of a flying spot scanning system according to a fifth embodiment.

In this embodiment, the basic structure is substantially the same as in the fourth embodiment. However, both the meniscus lens 15a and the concave mirror 15b (FIGS. 11 and 12) are parabolic as illustrated in FIG. 14. The concave mirror 15b has a parabolic in the horizontal direction and no curvature in the vertical direction.

In this embodiment, the optical elements are designed so that the effective scanning length is 560 mm and so that the diameter of the scanning spots is 9.2 μm at half-width power.

Both the focusing lens 7 and the deflection mirror 8 are designed and positioned as in the fourth embodiment. The distance V, obtained by subtracting the distance between the focusing lens 7 and the deflection mirror 8 from the back focus of the focusing lens, 7 is 1100 mm.

The meniscus lens 15a (which has a spherically-bent shape is positioned at a distance of 634.305 mm from the deflection mirror 8 and 335.742 mm from the parabolic concave mirror. The concave incident surface of the meniscus lens 15a is directed toward the deflection mirror 8. Hereinbelow is shown the conditions of the meniscus lens 15a.

TABLE 6

|   | r (mm)   | d (mm) | n       |
|---|----------|--------|---------|
| 1 | −362.260 | 15.0   | 1.52224 |
| 2 | −365.240 |        |         |

$f = 1.17 \times 10^5$ (mm)

The ratio of the distance V to the focal length $f_N$ is less than 0.01.

The concave mirror 15b has a focal length $f_M$ of 1000 mm. Therefor:

$$f_M = 0.91 \text{ V} \tag{10}$$

The ratio of $f_M$ to V is 0.91, and the ratio of the distance b (between the deflection mirror 8 and the concave mirror 15b) to V is 0.91.

The half-mirror 11a is positioned at a distance of 50 mm from the concave mirror 15b and 50 mm from the recording surface S.

Figure 15A:
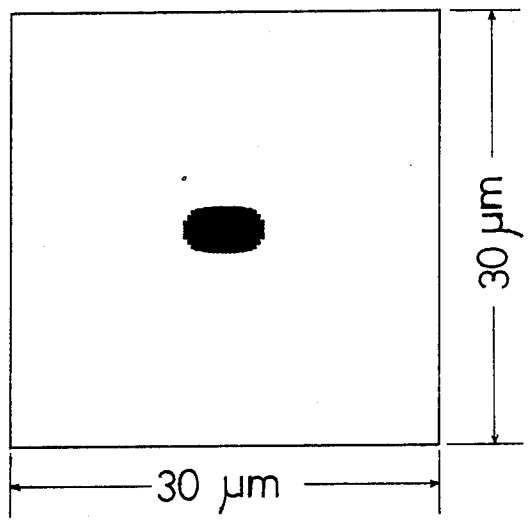
FIGS. 15-(A) to 15-(C) are spot diagrams corresponding to a fifth embodiment of the invention.
Figure 15B:
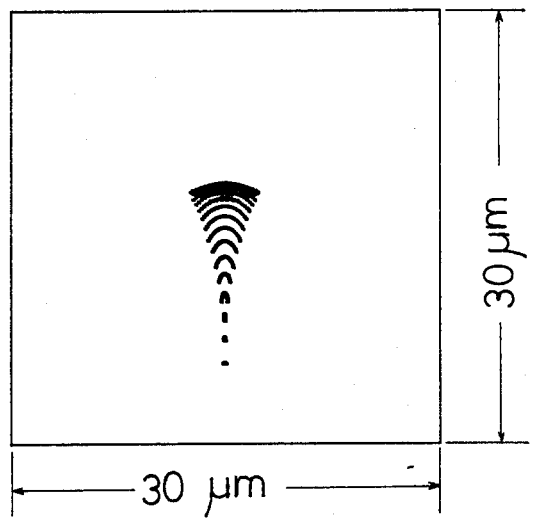
Figure 15:
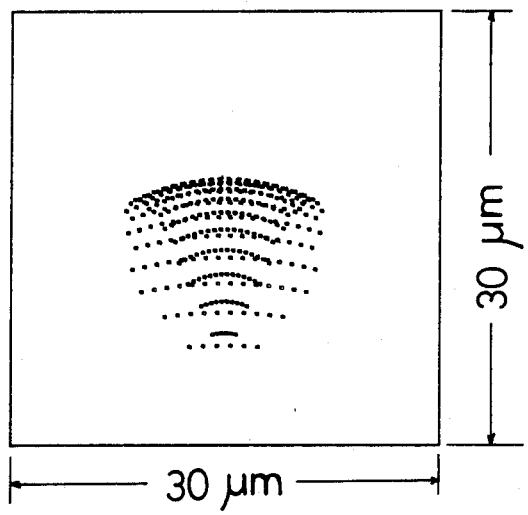

FIGS. 15-(A) to 15-(C) are spot diagrams, on the image plane, of the one of the twenty-one beams when the image height is 0 mm, 200 mm and 280 mm, respectively. The frame size these diagrams is of 30 μm square. Therefore, the lateral abberation of the recording spot is no greater than approximately ±7 μm.

The Strehl definition can be more than 0.90 on every scanning spots aligned for the image plane. Interval variations between adjacent scanning spot, which are aligned in the direction A, are no more than 0.026% even when the image height is 275 mm. In comparison with the fourth embodiment, these will be apparently more excellent and ideal than those in the fourth embodiment. The reason for excellence in this embodiment is that the optical length between the deflection mirror 8 and the recording surface 5 is kept approximately constant independently of the rotating angle of the deflection mirror by using the parabolic mirror 15b.

The preferred embodiments described above have excellent optical characteristics and are approximately ideal for recording an image on a recording medium.

In the aforementioned embodiments, the deflection mirror may be positioned within the range of:

$$0.9 < f_M / V < 1.05 \tag{3}$$

where $f_M$ is a focal length of the concave mirror, and V is a distance obtained by subtracting the distance between the focusing less 7 and the deflection mirror 8 from the back focal length of the focusing lens 7.

The concave mirror 15 may be disposed at a position within the range of:

$$0.75 < b/V < 0.95 \tag{2}$$

where b is a distance between the deflection mirror and the concave mirror.

In a case where the concave mirror comprises a second-surface mirror, the concave mirror may be designed so that the following formula is satisfied.

$$0.95 < r_1/r_2 < 1.0 \tag{4}$$

where $r_1$ is a radius of the first surface of the concave mirror, and $r_2$ is a radius of the second surface thereof.

In a case where the concave mirror comprises a first-surface mirror, a meniscus lens to be disposed optically before the concave mirror may be designed so that the following formula is satisfied.

$$|V/f_N| < 0.02 \tag{5}$$

where V is a distance obtained by subtracting a distance between the focusing lens 7 and the deflection mirror 8 from the back focal length of the focusing lens 7, and $f_N$ is a focal length of the meniscus lens.

In the precedent embodiments, the laser beams $B_6$ received by the focusing lens 7 are collimated by the collimator lens 6. However, the collimator lens 6 is not necessary. In the following embodiment a collimator lens is not employed.

SIXTH EMBODIMENT

Figure 16:
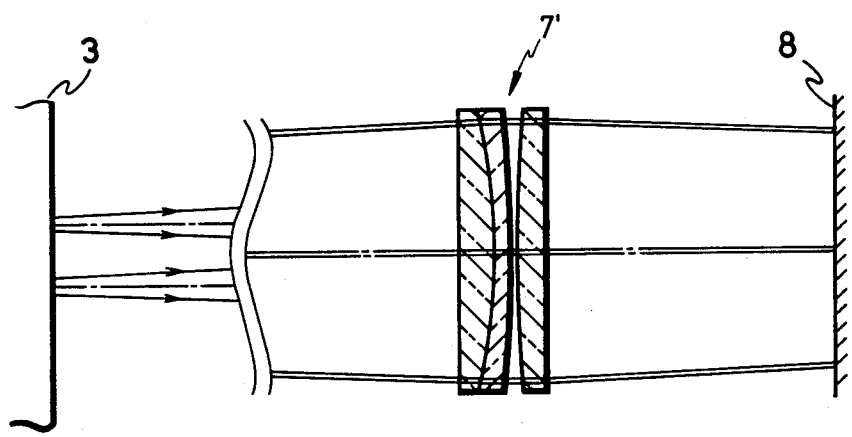
FIG. 16 is side view of a part of a optical system according to a sixth embodiment.

The embodiment of FIGS. 1 and 16 has substantially the same basic structure as in the precedent embodiments, except for the field lens 4 and the collimator lens 6.

For ease of explanation, all optical elements of this embodiment are the same as in the first embodiment. However, features of the sixth embodiment can be incorporated into any one of the precedent embodiments.

The focusing lens 7' of FIG. 16 comprises a single optical unit including three lenses, whose lens data are shown hereinbelow.

TABLE 7

|   | r (mm)   | d (mm) | n       |
|---|----------|--------|---------|
| 1 | 4515.582 | 25.00  | 1.52224 |
| 2 | −455.712 | 10.00  | 1.63178 |
| 3 | −962.605 | 5.00   |         |
| 4 | 1271.949 | 20.00  | 1.52224 |
| 5 | ∞        |        |         | f = 1063.439 (mm)
Effective Aperture = 180 (mm)
Back Focus = 1046.265 (mm)

The focusing lens 7' is positioned at a distance of 2103.302 mm from the exit of the modulator 3. Assuming that a beam waist of the respective laser beams is formed at the exit of the modulator 3 and that the diameter of the beam waist is 5.5 μm at half-width power, another beam waist of 5.5 μm in diameter at half-width power will be formed, by the focusing lens 7', at a position which is 2109.704 mm away from the exit surface of the focusing lens. The position where the beam waist is formed by the focusing lens corresponds to the back focal length of the focusing lens 7 of the first embodiment. Accordingly, by disposing the deflection mirror 8 at a position of 227.782 mm away from the focusing lens recording can be performed in substantially the same manner as in the first embodiment.

The invention has been illustrated and described in connection with a flying spot scanning system. However, the invention should not be limited to the details thereof. Various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An optical system for a flying spot scanning apparatus, comprising:
    a light source emitting a light beam;
    optical modulator means for modulating the light beam;
    a focusing lens forming a beam waist on an optical axis thereof;
    deflection means disposed optically between the focusing lens and a recording medium for reciprocatingly deflecting the light beam to scan the recording medium;
    a concave mirror disposed optically between the deflection means and the recording medium, the concave mirror extending along a direction where a recording spot of the light beam runs thereon; and
    the recording medium disposed optically behind the concave mirror, the recording medium being laid on an image plane of the optical system and fed in a predetermined direction while the recording spot scans the recording medium,
    wherein the deflection means being disposed at a position where a distance given by subtracting a distance between the focusing lens and the deflection means from a distance between the focusing lens and a beam waist formed by the focusing lens, is approximately equal to the focal length of the concave mirror, and
    the concave mirror comprising a second-surface mirror disposed at a position such that the following formula is satisfied:

$$0.75 < b/V < 0.95$$

where V is a distance given by subtracting a distance between the focusing lens and the deflection means from a distance between the focusing lens and a beam waist formed by the focusing lens, and b is a distance between the deflection means and the concave mirror.

2. An optical system as set forth in claim 1, further comprising beam dividing means disposed between the light source and the modulator means for dividing a light beam into a plurality of light beams,
    wherein the modulator means being designed so that the plurality of light beams are individually modulated.

3. An optical system as set forth in claim 2, further comprising:
    a field lens condensing the light beams emerged from the modulator means, the field lens being designed so that the principal rays of the light beams are consistent with one another on the deflection means.

4. An optical system as set forth in claim 1, further comprising a condenser lens disposed between the light source and the modulator means, whereby a light beam emitted from the light source is condensed, to enter the modulator means.

5. An optical system for a flying spot scanning apparatus, comprising:
    a laser tube emitting a laser beam;
    beam dividing means for dividing the laser beam into a plurality of laser beams;
    optical modulator means for individually modulating the plurality of laser beams;
    a field lens condensing the laser beams emerged from the modulator means;
    collimator means for collimating the laser beams transmitted through the field lens;
    a focusing lens focusing the plurality of laser beams upon a recording medium;
    deflection means for reciprocatingly deflecting the respective laser beams to scan the recording medium;
    a concave second-surface mirror receiving the laser beams thereon, the concave mirror extending along a direction where the laser beams are deflected by the deflection means; and
    a recording medium disposed optically behind the concave mirror, the recording medium being laid on an image plane of the optical system and fed in a predetermined direction while the recording spots scan the recording medium,
    wherein the deflection means being disposed at a position where a distance given by subtracting a distance between the focusing lens and the deflection means from a back focal length of the focusing lens is approximately equal to the focal length of the concave mirror, and
    the concave mirror being disposed at a position where the following formula is satisfied:

$$0.75 < b/V < 0.95$$

where V is a distance given by subtracting a distance between the focusing lens and the deflection means from the back focal length of the focusing lens, and b is a distance between the deflection means and the concave mirror.

6. An optical system for flying spot scanning apparatus, comprising:
    a laser tube emitting a laser beam;
    beam dividing means for dividing the laser beam into a plurality of laser beams;
    optical modulator means for individually modulating respective laser beams;
    a field lens condensing the laser beams emerged from the modulator means;

a collimator lens collimating the laser means transmitted through the field lens;
a focusing lens focusing the respective laser beams upon a recording medium;
deflection means for reciprocatingly deflecting the respective laser beams to scan the recording medium;
a concave first-surface mirror extending along a direction where the laser beams are deflected by the deflection means;
a meniscus lens disposed optically between the deflection means and the concave mirror; and
a recording medium disposed optically behind the concave mirror, the recording medium being laid on an image plane of the optical system and fed in a predetermined direction while the recording spots scan the recording medium,
wherein the deflection means being disposed at a position where a distance given by subtracting a distance between the focusing lens and the deflection means from a back focal length of the focusing lens is approximately equal to the focal length of the concave mirror, and
the meniscus lens being designed so that the following formula is satisfied:

$$|V/f_N| < 0.02$$

where V is a distance given by subtracting a distance between the focusing lens and the deflection means from the back focal length of the focusing lens, and $f_N$ is a focal length of the meniscus lens.

7. An optical system for use in a flying spot scanning apparatus, said optical system comprising:
a focusing lens for focusing a light beam on a recording medium;
deflecting means for reciprocatingly deflecting said light beam to scan said focused light beam across said recording medium; and
a concave mirror for reflecting said reciprocatingly deflected light beam; and
wherein said optical system satisfies the following conditions:

$$V \simeq f_M;$$

and $$0.75 < b/V < 0.95;$$

wherein:
V is a distance obtained by subtracting the distance between said focusing lens and said deflecting means from a back focal length of said focusing lens;
$f_M$ is the focal length of said concave mirror; and
b is the distance between said deflecting means and said concave mirror.

8. The optical system of claim 7, wherein said deflecting means includes a deflection mirror and a galvanometer coaxially mounted to said deflection mirror, said galvanometer including means for reciprocatingly rotating said deflection mirror.

9. The optical system of claim 7, wherein said deflecting means is positioned so as to satisfy the following condition:

$$0.9 < f_M/V < 1.05.$$

10. The optical system of claim 7, wherein said concave mirror includes a second-surface mirror, said second-surface mirror including a concave optical glass plate, said glass plate having a back surface and a front surface, said back surface being coated by metal film, said concave mirror satisfying the following condition:

$$0.95 < r_1/r_2 < 1.0$$

wherein $r_1$ is the radius of said front surface and $r_2$ is the radius of said back surface.

11. The optical system of claim 7, wherein said concave mirror is a spherical band.

12. The optical system of claim 7, wherein said concave mirror is a parabolic band.

13. The optical system of claim 7, wherein:
said concave mirror includes a first-surface mirror;
said optical system further comprises a meniscus lens optically located between said deflecting means and said concave mirror; and
wherein said optical system satisfies the following condition:

$$|V/f_N| < 0.02;$$

wherein $f_N$ is the focal length of said meniscus lens.

14. The optical system of claim 7, further comprising directing means located between said deflecting means and said concave mirror for transmitting said light beam therethrough to said concave mirror and directing said light beam reflected from said concave mirror toward said recording medium.

15. An optical system for use in a flying spot scanning apparatus, said optical system comprising:
a focusing lens for focusing a light beam on a recording medium;
deflecting means for reciprocatingly deflecting said light beam to scan said focused light beam across said recording medium;
a concave, first-surface mirror for reflecting said reciprocatingly deflected light beam; and
a meniscus lens optically located between said deflecting means and said concave mirror; and
wherein said optical system satisfies the following conditions:

$$V \simeq f_M;$$

and $$V/f_N < 0.02;$$

wherein:
V is a distance obtained by subtracting the distance between said focusing lens and said deflecting means from a back focal length of said focusing lens;
$f_M$ is the focal length of said concave mirror; and
$f_N$ is the focal length of said meniscus lens.

16. The optical system of claim 15, wherein said deflecting means includes a deflection mirror and a galvanometer coaxially mounted to said deflection mirror, said galvanometer including means for reciprocatingly rotating said deflection mirror.

17. The optical system of claim 15, wherein said deflecting means is positioned so as to satisfy the following condition:

$$0.9 < f_M/V < 1.05.$$

* * * * *